United States Patent
Correia (10) Patent No.: US 10,557,362 B2
(45) Date of Patent: Feb. 11, 2020

(54) METHOD AND SYSTEM FOR A PRESSURE ACTIVATED CAP SEAL

(71) Applicant: General Electric Company, Schenectady, NY (US)

(72) Inventor: Victor Hugo Silva Correia, Milton Mills, NH (US)

(73) Assignee: General Electric Company, Schenectady, NY (US)

(*) Notice: Subject to any disclaimer, the term of this patent is extended or adjusted under 35 U.S.C. 154(b) by 482 days.

(21) Appl. No.: 15/474,544

(22) Filed: Mar. 30, 2017

(65) Prior Publication Data

US 2018/0283194 A1 Oct. 4, 2018

(51) Int. Cl.
*F01D 11/04* (2006.01)
*F02C 3/04* (2006.01)
*F01D 9/04* (2006.01)

(52) U.S. Cl.
CPC ............... *F01D 11/04* (2013.01); *F01D 9/04* (2013.01); *F02C 3/04* (2013.01); *F05D 2300/6033* (2013.01)

(58) Field of Classification Search
CPC .......... F01D 11/04; F01D 9/04; F01D 11/005; F01D 11/003; F02C 3/04; F02C 7/28; F05D 2240/11; F05D 2230/642
See application file for complete search history.

(56) References Cited

U.S. PATENT DOCUMENTS

| | | | |
|---|---|---|---|
| 3,938,906 A | 2/1976 | Michel et al. | |
| 4,815,933 A | 3/1989 | Hansel et al. | |
| 6,739,594 B2* | 5/2004 | Beeck | F01D 5/08 277/433 |
| 6,932,568 B2 | 8/2005 | Powis et al. | |
| 8,206,093 B2* | 6/2012 | Irmisch | F01D 9/023 415/173.7 |
| 8,215,645 B1* | 7/2012 | Aho, Jr. | F16J 15/342 277/370 |
| 8,657,573 B2* | 2/2014 | Munson | F01D 11/003 277/416 |
| 8,702,374 B2 | 4/2014 | Butler | |
| 9,394,799 B1* | 7/2016 | Mills | F16J 15/34 |
| 9,732,621 B1* | 8/2017 | Sexton | F01D 11/025 |
| 2002/0061250 A1* | 5/2002 | Beeck | F01D 5/08 416/174 |
| 2011/0250056 A1* | 10/2011 | Munson | F01D 11/003 415/170.1 |
| 2013/0183180 A1 | 7/2013 | Batt | |
| 2015/0118033 A1 | 4/2015 | Smith et al. | |
| 2016/0090851 A1 | 3/2016 | Carr et al. | |
| 2016/0090866 A1 | 3/2016 | Hurst et al. | |
| 2016/0097303 A1 | 4/2016 | Baldiga et al. | |
| 2016/0281521 A1* | 9/2016 | Clum | F01D 11/005 |

* cited by examiner

*Primary Examiner* — Eldon T Brockman
(74) *Attorney, Agent, or Firm* — McGarry Bair PC (57) ABSTRACT

A sealing system for sealing a gap between two adjacent components includes a first component including a sealing face, a second component, and a seal cap. The second component includes a seal ridge extending from a surface of the second component towards the sealing face, and a fluid conduit extending through the second component and the seal ridge, the fluid conduit configured to channel a seal activating fluid from a fluid source. The seal cap is configured to matingly engage the seal ridge, and includes an end wall positionable between the sealing face and the seal ridge, and a pair of seal legs extending from the end wall towards the surface of the second component.

20 Claims, 5 Drawing Sheets

METHOD AND SYSTEM FOR A PRESSURE ACTIVATED CAP SEAL

BACKGROUND

The field of the disclosure relates generally to gas turbine engines and, more particularly, to a method and system for a pressure activated cap seal.

In at least some known machinery systems, a seal is positioned between two adjacent components to prevent or restrict airflow between those components. For example, in at least some known engines, a spline seal is positioned between two adjacent segments of a turbine shroud. In another example, "W" or bellow-type seals are positioned between axially-adjacent components, such as a turbine and a nozzle. However, especially in high-temperature environments, these seals have temperature limits and may break down over time. Accordingly, those seals lose sealing capability and must be replaced. Moreover, at least some known seals are high-stress seals, and this stress can exacerbate seal breakdown.

BRIEF DESCRIPTION

In one aspect, a sealing system for sealing a gap between two adjacent components is provided. The sealing system includes a first component, a second component, and a seal cap. The first component includes a sealing face. The second component includes a seal ridge extending from a surface of the second component towards the sealing face, and a fluid conduit extending through the second component and the seal ridge. The fluid conduit is configured to channel a seal activating fluid from a fluid source. The seal cap is configured to matingly engage the seal ridge. The seal cap includes an end wall positionable between the sealing face and the seal ridge, and a pair of seal legs extending from the end wall towards the surface of the second component.

In one aspect of the disclosure, which may include at least a portion of the subject matter of any of the preceding and/or following examples and aspects, the seal cap is movable between a first, retracted position and a second, sealing position.

In one aspect of the disclosure, which may include at least a portion of the subject matter of any of the preceding and/or following examples and aspects, in the first, retracted position, a gap is formed between the sealing face and the end wall.

In one aspect of the disclosure, which may include at least a portion of the subject matter of any of the preceding and/or following examples and aspects, in the second, sealing position, the sealing face and the end wall are in contact.

In one aspect of the disclosure, which may include at least a portion of the subject matter of any of the preceding and/or following examples and aspects, a force imparted by a flow of the seal activating fluid is configured to move the seal cap from the first, retracted position and to the second, sealing position.

In one aspect of the disclosure, which may include at least a portion of the subject matter of any of the preceding and/or following examples and aspects, the seal cap and the seal ridge each extend linearly from a respective first end to a respective second end.

In one aspect of the disclosure, which may include at least a portion of the subject matter of any of the preceding and/or following examples and aspects, the seal cap and the seal ridge each extend arcuately from a respective first end to a respective second end.

In one aspect of the disclosure, which may include at least a portion of the subject matter of any of the preceding and/or following examples and aspects, the seal ridge extends axially in a rotatable machine and includes a first end and an opposing second end, and the seal cap extends between a first end corresponding to the seal ridge first end and a second end corresponding to the seal ridge second end.

In one aspect of the disclosure, which may include at least a portion of the subject matter of any of the preceding and/or following examples and aspects, the seal ridge extends axially about a circumference of the second component and the seal cap further includes an arcuate shape complementary to a shape of the seal ridge.

In one aspect of the disclosure, which may include at least a portion of the subject matter of any of the preceding and/or following examples and aspects, one of the first component and the second component is fabricated from a metal material, and the other of the first component is fabricated from a ceramic matrix composite material.

In one aspect of the disclosure, which may include at least a portion of the subject matter of any of the preceding and/or following examples and aspects, the end wall of the seal cap includes a recess therein and at least one opening therethrough, the at least one opening configured to permit at least a portion of the seal activating fluid to flow therethrough, to generate a cushion of air within the recess, to reduce contact between the end wall and the sealing surface.

In one aspect of the disclosure, which may include at least a portion of the subject matter of any of the preceding and/or following examples and aspects, the seal cap is fabricated from at least one of a metal material and a composite material.

In another aspect, a method of operating a sealing system for sealing a gap between two adjacent components is provided. The method includes positioning a seal cap between a first component including a sealing face and a second component including a seal ridge extending from a surface of the second component towards the sealing face, and a fluid conduit extending through the second component and the seal ridge. The method also includes channeling a seal activating fluid from a fluid source through the fluid conduit, the channeling imparting a force on the seal cap to move the seal cap from a first, retracted position, in which the seal cap matingly engages the seal ridge of the first component, to a second, sealing position, in which the seal cap contacts the sealing face of the first component.

In one aspect of the disclosure, which may include at least a portion of the subject matter of any of the preceding and/or following examples and aspects, a gap is formed between the sealing face and the seal cap in the first, retracted position, the channeling at least partially sealing the gap.

In one aspect of the disclosure, which may include at least a portion of the subject matter of any of the preceding and/or following examples and aspects, the first component and the second component are circumferentially spaced from one another, such that the positioning includes positioning the seal cap in a substantially axially extending orientation between the first component and the second component.

In one aspect of the disclosure, which may include at least a portion of the subject matter of any of the preceding and/or following examples and aspects, the first component and the second component are axially spaced from one another, such that the positioning includes positioning the seal cap in a substantially circumferentially extending orientation between the first component and the second component.

In yet another aspect, a turbofan engine is provided. The turbofan engine includes a core turbine engine including a compressor, a combustor, and a turbine, and a segmented turbine shroud at least partially surrounding the turbine. The segmented turbine shroud includes a plurality of shroud segments arranged circumferentially about the turbine. The plurality of shroud segments includes a first shroud segment and a second shroud segment. The first shroud segment includes a sealing face. The second shroud segment includes a seal ridge extending from a surface of the second shroud segment towards the sealing face, and a fluid conduit extending through the second segment and the seal ridge. The fluid conduit is configured to channel a seal activating fluid from a fluid source. The segmented turbine shroud further including a seal cap configured to matingly engage the seal ridge. The seal cap includes an end wall positionable between the sealing face and the seal ridge, and a pair of seal legs extending from the end wall towards the surface of the second segment.

In one aspect of the disclosure, which may include at least a portion of the subject matter of any of the preceding and/or following examples and aspects, the seal cap is movable between a first, retracted position, in which a gap is formed between the sealing face and the end wall, and a second, sealing position, in which the sealing face and the end wall are in contact.

In one aspect of the disclosure, which may include at least a portion of the subject matter of any of the preceding and/or following examples and aspects, a force imparted by a flow of the seal activating fluid may be configured to move the seal cap from the first, retracted position and to the second, sealing position.

In one aspect of the disclosure, which may include at least a portion of the subject matter of any of the preceding and/or following examples and aspects, one of the first component and the second component is fabricated from a metal material, the other of the first component and the second component is fabricated from a ceramic matrix composite material, and the seal cap is fabricated from at least one of a metal material and a ceramic matrix composite material.

DRAWINGS

These and other features, aspects, and advantages of the present disclosure will become better understood when the following detailed description is read with reference to the accompanying drawings in which like characters represent like parts throughout the drawings, wherein.

Unless otherwise indicated, the drawings provided herein are meant to illustrate features of embodiments of this disclosure. These features are believed to be applicable in a wide variety of systems comprising one or more embodiments of this disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a," "an," and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise.

As used herein, the terms "axial" and "axially" refer to directions and orientations that extend substantially parallel to a centerline of an engine. Moreover, the terms "radial" and "radially" refer to directions and orientations that extend substantially perpendicular to the centerline of the engine. In addition, as used herein, the terms "circumferential" and "circumferentially" refer to directions and orientations that extend arcuately about the centerline of the engine.

Embodiments of the sealing systems described herein provide a cost-effective method for improving a seal between separate components in high-temperature environments. The sealing system can be adapted for use between two segments of a component (e.g., segments of a turbine shroud) and/or for use between two separate components (e.g., between a turbine shroud and a nozzle). A seal cap positioned between the two components is selectively moved between a retracted position and a sealing position. Specifically, a fluid is channeled through one of the components, and the pressure of the fluid on the seal cap forces the seal cap into the sealing position. The seal cap is fabricated from a material capable of withstanding high temperatures, and the seal affected by the seal cap experiences less stress than a conventional compliance seal, and as such, may be a low-stress or effectively no-stress seal. Accordingly, the sealing system described herein facilitates improving the operating lifetime of a component seal, reducing maintenance and/or replacement costs thereof.

Figure 1:
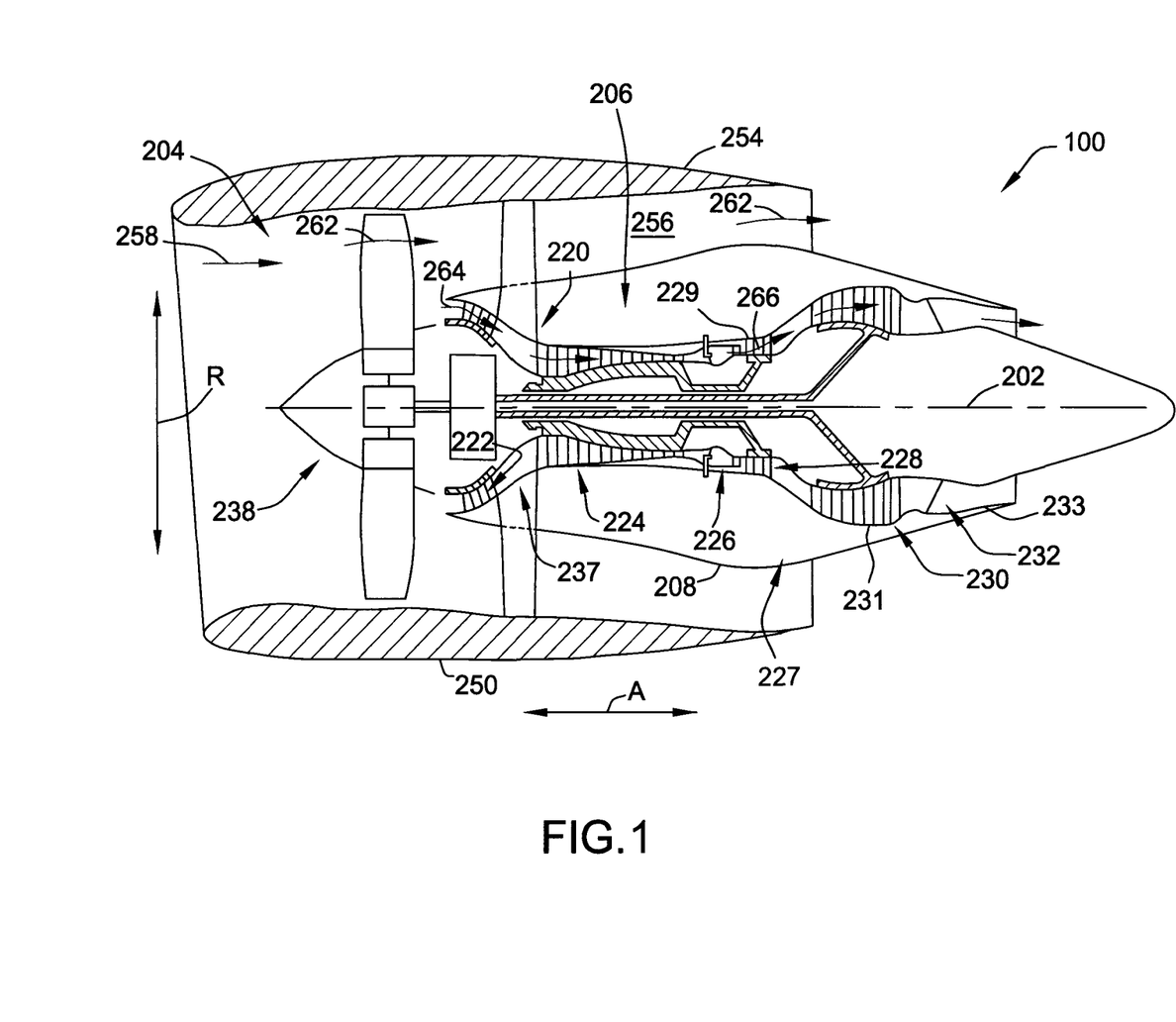
FIG. 1 is a schematic illustration of an exemplary engine.

FIG. 1 is a schematic cross-sectional view of an engine 100 in accordance with an exemplary embodiment of the present disclosure. In the example embodiment, engine 100 is embodied as a high-bypass turbofan jet engine. As shown in FIG. 1, engine 100 defines an axial direction A (extending parallel to a longitudinal axis 202 provided for reference) and a radial direction R. In general, engine 100 includes a fan assembly 204 and a core turbine engine 206 disposed downstream from fan assembly 204. In the example embodiment, core turbine engine 206 includes an engine case 208 that at least partially surrounds, in serial flow relationship, a compressor section 220 including a booster or low pressure (LP) compressor 222 and a high pressure (HP) compressor 224; a combustion section 226; a turbine section 227 including a high pressure (HP) turbine 228 surrounded by a circumferential turbine shroud 229 and a low pressure (LP) turbine 230 surrounded by a circumferential turbine shroud 231; and a jet exhaust nozzle section 232 including a circumferential nozzle 233. Compressor section 220, combustion section 226, turbine section 227, and nozzle section 232 together define a core air flowpath 237.

Fan assembly 204 include a fan 238, as well as an annular fan casing or outer nacelle 250 that circumferentially surrounds fan 238 and/or at least a portion of core turbine engine 206. A downstream section 254 of nacelle 250 may extend over an outer portion of core turbine engine 206 so as to define a bypass airflow passage 256 therebetween.

During operation of engine 100, a volume of air 258 enters engine 100. As volume of air 258 passes through fan assembly 204, a first portion 262 of volume of air 258 is directed or routed into bypass airflow passage 256 and a second portion 264 of volume of air 258 is directed or routed into core air flowpath 237, or more specifically into LP compressor 222. The pressure of second portion 264 is increased as it is routed through high pressure (HP) compressor 224 and into combustion section 226, where it is mixed with fuel and burned to provide combustion gases 266. Combustion gases 266 are routed through HP turbine 228 and/or LP turbine 230 where thermal and/or kinetic energy from combustion gases 266 is extracted to drive rotation of LP compressor 222, HP compressor 224, and/or fan 238. Combustion gases 266 are subsequently routed through jet exhaust nozzle section 232 of core turbine engine 206 to provide propulsive thrust.

Engine 100 is depicted in the figures by way of example only, in other exemplary embodiments, engine 100 may have any other suitable configuration including for example, a turboprop engine, a military purpose engine, and a marine or land-based aero-derivative engine.

Figure 2A:
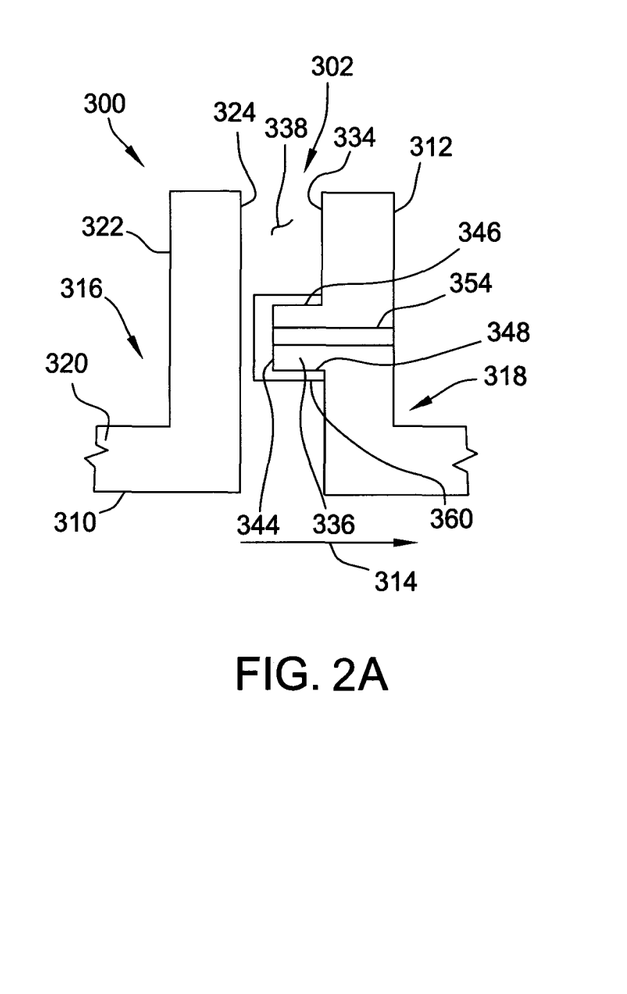
FIGS. 2A and 2B are side cross-sectional views of a first exemplary sealing system that may be used in the engine shown in FIG. 1.
Figure 2B:
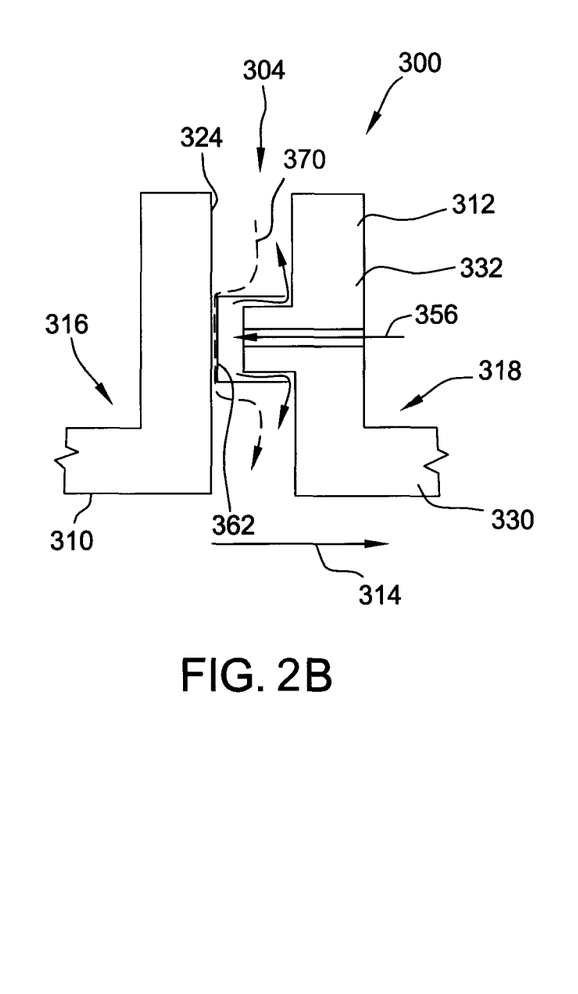
Figure 3:
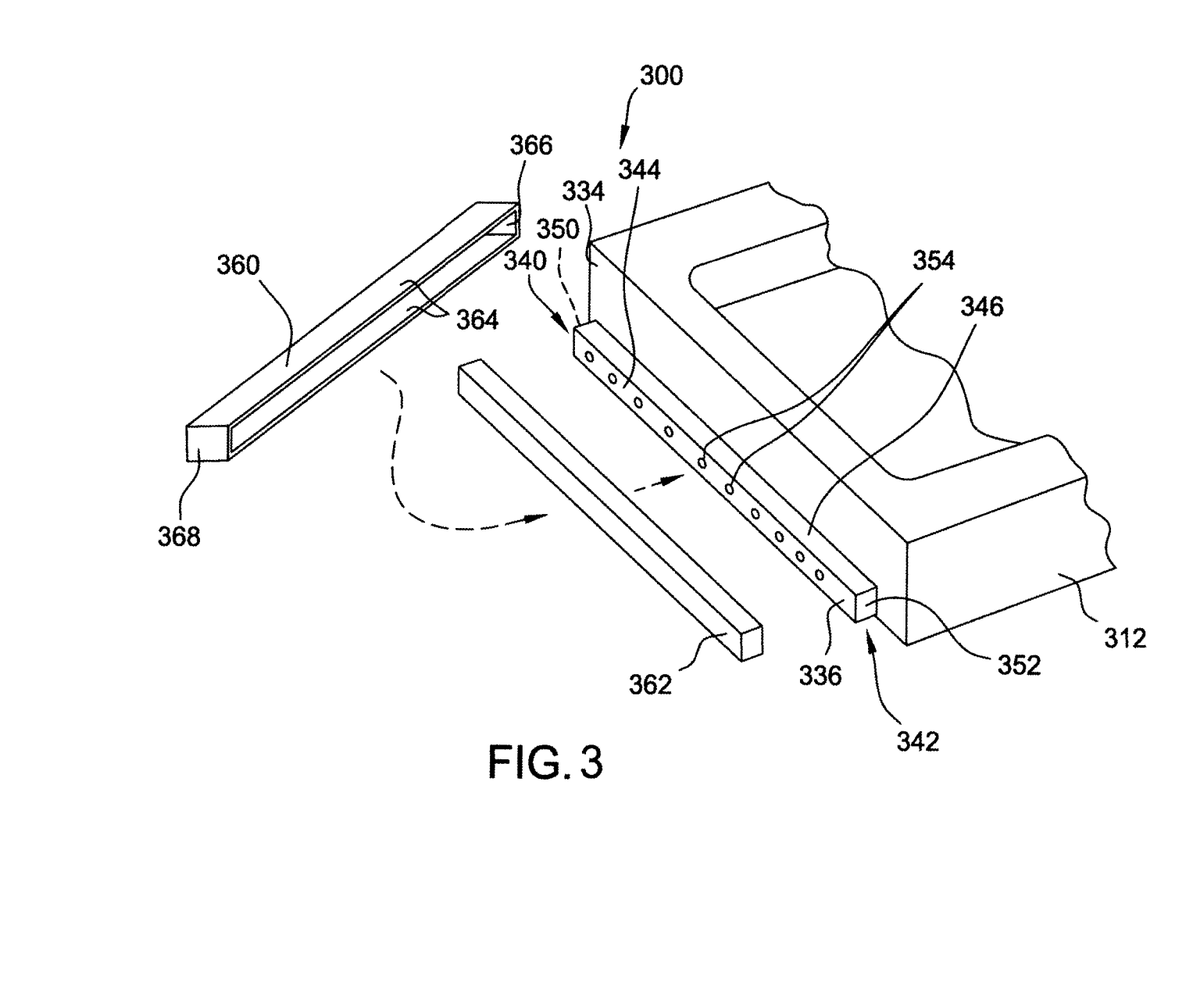
FIG. 3 is a perspective view of the sealing system shown in FIGS. 2A and 2B.

FIGS. 2A and 2B are each side cross-sectional views of a first exemplary embodiment of a sealing system 300 that may be used in engine 100 (shown in FIG. 1). More specifically, FIG. 2A is a side cross-sectional view of sealing system 300 in a first configuration 302 when engine 100 is not operating, and FIG. 2B is a side cross-sectional view of sealing system 300 in a second, sealing configuration 304 when engine 100 is operating. FIG. 3 is a perspective view of sealing system 300 shown in FIGS. 2A and 2B. In the illustrated embodiment, sealing system 300 provides a seal between a first component 310 and a second component 312, wherein first and second components 310, 312 are segments of a circumferential engine component. For example, first and second components 310, 312 are, in one embodiment, segments of one of circumferential turbine shrouds 229, 231 or circumferential nozzle 233. Second component 312 is positioned circumferentially adjacent to first component 310 (a circumferential direction 314 is labeled for convenience).

In the illustrated embodiment, first component 310 includes a body 320, as well as a side wall 322 extending from body 320. Side wall 322 defines a sealing face 324 of first component 310. First component 310 is fabricated from any material suitable to enable first component 310 to function and to withstand temperatures experienced in the environment of first component 310. For instance, where first component 310 is a segment 316 of one of circumferential turbine shrouds 229, 231 or circumferential nozzle 233, first component 310 may be fabricated from a metal material or a ceramic or ceramic matrix composite (CMC) material.

Second component 312 includes a body 330, as well as a side wall 332 extending from body 330. Side wall 332 defines a first surface 334 of second component 312. A protrusion or seal ridge 336 extends from first surface 334 in circumferential direction 314. More specifically, when first and second component 310, 312 are positioned circumferentially with respect to one another, seal ridge 336 extends in circumferential direction 314 towards sealing face 324. A gap 338 is defined between sealing face 324 and seal ridge 336. Gap 338 extends in circumferential direction 314. In the illustrated embodiment, seal ridge 336 extends from a first end 340 to a second end 342, as shown in FIG. 3. Seal ridge 336 may extend linearly from first end 340 to second end 342, arcuately from first end 340 to second end 342, and/or in any other orientation or with any other profile between first end 340 and second end 342. Seal ridge 336 defines a first or end face 344, a second or top face 346, and a third or bottom face 348. Seal ridge 336 further defines a fourth or left face 350 at first end 340 and a fifth or right face 352 at second end 342.

Second component 312 also includes at least one passage or fluid conduit 354 extending through side wall 332. In the illustrated embodiment, fluid conduit 354 also extends through seal ridge 336. Fluid conduit 354 channels a seal-activating fluid 356 (see FIG. 2B) therethrough. Seal-activating fluid 356 originates at a fluid source, such as a source of air flow from an HP compressor stage or an exit of HP compressor 224 (shown in FIG. 1).

Second component 312 is fabricated from any material suitable to enable second component 312 to function and to withstand the temperatures experienced in the environment of second component 312. For instance, where second component 312 is a segment 318 of one of circumferential turbine shrouds 229, 231 or circumferential nozzle 233, second component 312 may be fabricated from a metal material or a ceramic or CMC material.

Sealing system 300 also includes a seal cap 360. Seal cap 360 is positioned between first component 310 and second component 312. More particularly, seal cap 360 is positioned in gap 338 between sealing face 324 and second component first surface 334. Seal cap 360 may be in a first, retracted position when sealing system 300 is in first configuration 302 and is in a second, sealing (or extended) position when sealing system 300 is in second configuration 304. When seal cap 360 is in the second, sealing position, seal cap 360 substantially seals gap 338.

Seal cap 360 includes an end wall 362 and a pair of legs 364 (also referred to as "seal legs" 364) extending from end wall 362. End wall 362 is positionable between sealing face 324 and seal ridge 336. Seal legs 364 extend from end wall 362 towards second component first surface 334. In the example embodiment, seal legs 364 have a length that is greater than gap 338 between seal ridge 336 and sealing face 324, such that seal cap 360 remains at least partially positioned over seal ridge 336 in any position. In the illustrated embodiment, seal cap 360 matingly engages seal ridge 336. More particularly, seal legs 364 engage top and bottom faces 346, 348 of seal ridge 336. When seal cap 360 is in the first, retracted position (see FIG. 3A), end wall 362 may also engage end face 344 of seal ridge 336. Seal cap 360 extends from a first end 366 to a second end 368 (see FIG. 3). Seal cap 360 may extend linearly from first end 366 to second end 368, arcuately from first end 366 to second end 368, and/or in any other orientation or with any other profile between first end 366 and second end 368. In the example embodiment, seal cap first end 366 corresponds generally to seal ridge first end 340, and seal cap second end 368 corresponds generally to seal ridge second end 342. In addition, as shown in FIG. 4, the profile of seal cap 360 corresponds generally to the profile of seal ridge 336.

In the illustrated embodiment, seal cap 360 may be fabricated from any material suitable to withstand the temperatures experienced in the environment of first and second components 310, 312. For example, where first and second components 310, 312 are segments 316, 318 of one of circumferential turbine shrouds 229, 231 or circumferential nozzle 233, seal cap 360 is fabricated from a metal material or a ceramic or CMC material.

Seal cap 360 is movable between the first, retracted position and the second, sealing position. In the illustrated embodiment, seal cap 360 moves or floats in a piston-like manner to transition between the first, retracted position and the second, sealing position. Specifically, seal-activating fluid 356 is channeled through fluid conduit 354, and a force imparted by the flow of seal-activating fluid 356 moves seal cap 360 from the first, retracted position and to the second, sealing position. End wall 362 contacts sealing face 324 to substantially seal gap 338. In the illustrated embodiment, the seal provided by seal cap 360 is subjected to less stress than conventional compliance seals.

In the example embodiment, "substantially seal" refers to a functional level of sealing that allows little, if any, bypass air therethrough. In the illustrated embodiment of FIGS. 2A-3, seal cap 360 does sustain limited bypass air 370 to pass between end wall 362 and sealing face 324. Moreover, this limited amount of bypass air 370 facilitates cooling of seal cap 360, which may experience high temperatures when in contact with sealing face 324.

In some alternative embodiments, sealing system 300 may include one or more elements configured to bias seal cap 360 back into the first, retracted position from the second, sealing position, for example, when seal-activating fluid 356 is not channeled through fluid conduit 354. A biasing element may include, for example, a spring or other such biasing member.

Figure 4A:
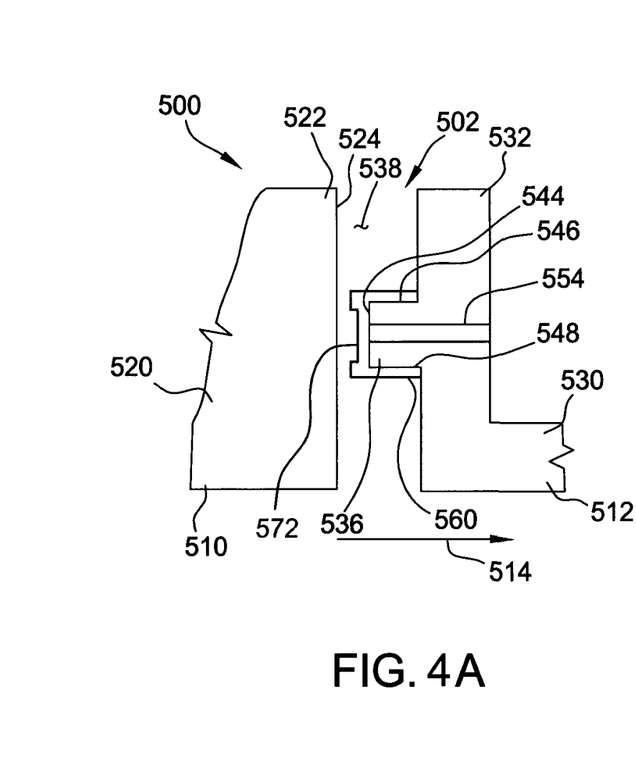
FIGS. 4A and 4B are side cross-sectional views of a second exemplary sealing system that may be used in the engine shown in FIG. 1.
Figure 4B:
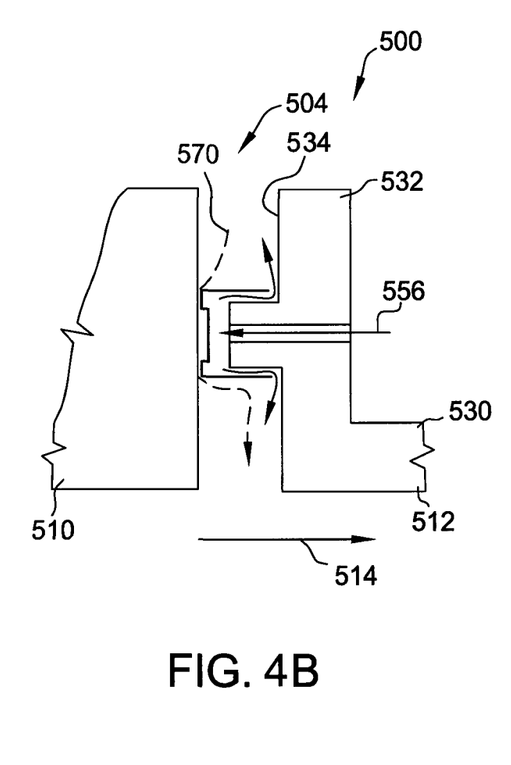
Figure 5:
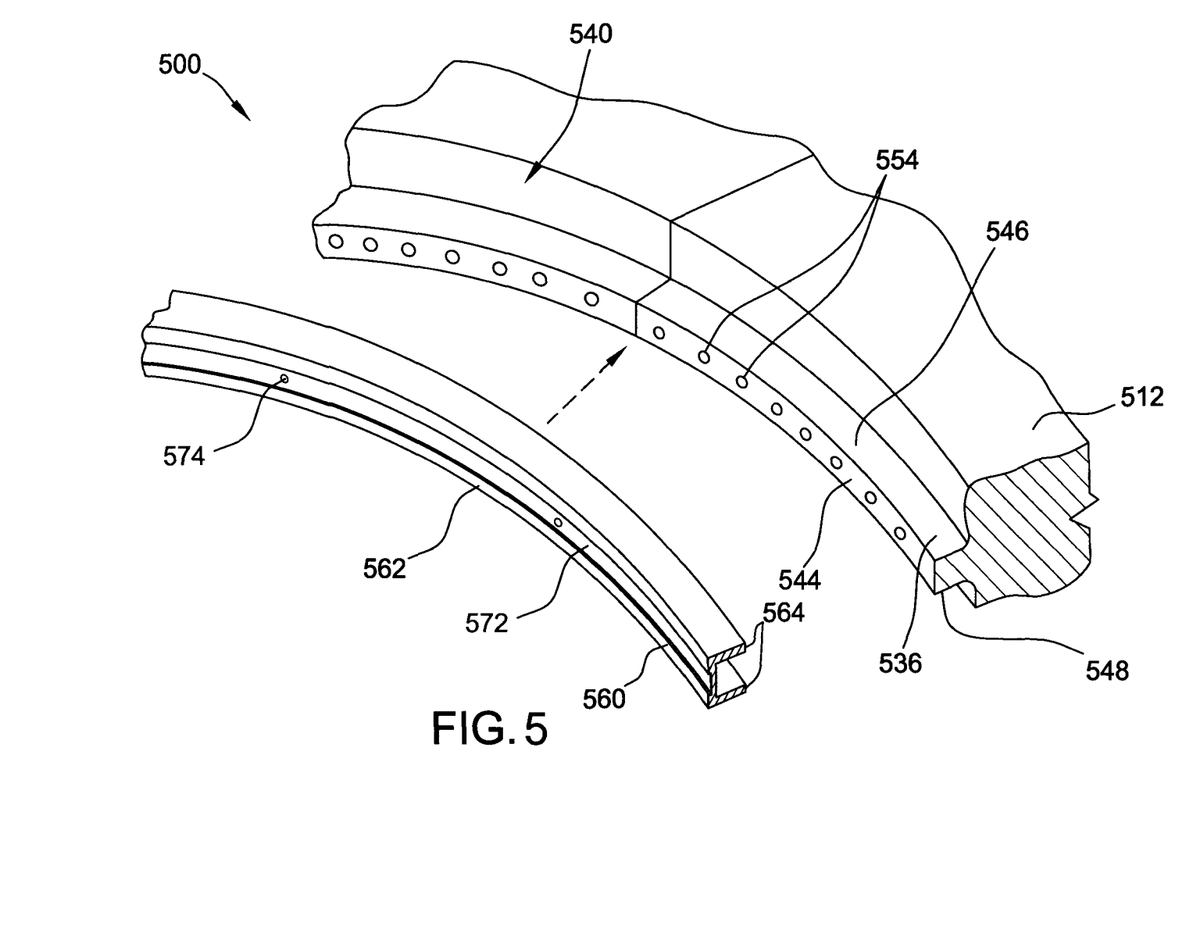
FIG. 5 is a perspective view of the sealing system shown in FIGS. 4A and 4B.

FIGS. 4A and 4B are side cross-sectional views of a second exemplary embodiment of a sealing system 500 that may be used in engine 100 (shown in FIG. 1). More specifically, FIG. 4A is a side cross-sectional view of sealing system 500 in a first configuration 502 when engine 100 is not operating, and FIG. 4B is a side cross-sectional view of sealing system 500 in a second, sealing configuration 504 when engine 100 is operating. FIG. 5 is a perspective view of sealing system 500 shown in FIGS. 4A and 4B. In the illustrated embodiment, sealing system 500 provides a seal between a first component 510 and a second component 512, wherein first and second components 510, 512 are separate, axially-adjacent engine components. For example, first and second components 510, 512 are, in one embodiment, one of circumferential turbine shrouds 229, 231 and circumferential nozzle 233, respectively. Second component 512 is arranged adjacent first component 510 in an axial direction 514 (parallel to axial direction A shown in FIG. 1).

In the illustrated embodiment, first component 510 includes a body 520 as well as a side wall 522 extending from body 520. Side wall 522 defines a sealing face 524 of first component 510. First component 510 is fabricated from any material suitable to enable first component 510 to function and to withstand the temperatures experienced in the environment of first component 510. For instance, where first component 510 is a one of circumferential turbine shrouds 229, 231 or circumferential nozzle 233, first component 510 may be fabricated from a metal material or a ceramic or ceramic matrix composite (CMC) material.

Second component 512 includes a body 530 as well as a side wall 532 extending from body 530. Side wall 532 defines a first surface 534 of second component 512. A seal ridge 536 extends from first surface 534 in axial direction 514. More specifically, when first and second component 510, 512 are positioned axially with respect to one another, seal ridge 536 extends in axial direction 514 towards sealing face 524. A gap 538 is defined between sealing face 524 and seal ridge 536, gap 538 extending in axial direction 514. In the illustrated embodiment, seal ridge 536 extends axially about an entire circumference 540 of second component 512, as shown in FIG. 5. In other words, seal ridge 536 may have a substantially arcuate profile or shape. Seal ridge 536 defines a first or end face 544, a second or top face 546, and a third or bottom face 548.

Second component 512 also includes at least one passage or fluid conduit 554 extending through side wall 532. In the illustrated embodiment, fluid conduit 554 also extends through seal ridge 536. Fluid conduit 554 channels a seal-activating fluid 556 (see FIG. 4B) therethrough. Seal-activating fluid 556 originates at a fluid source, such as a source of air flow from an HP compressor stage or an exit of HP compressor 224 (shown in FIG. 1).

Second component 512 is fabricated from any material suitable to enable second component 512 to function and to withstand the temperatures experienced in the environment of second component 512. For instance, where second component 512 is one of circumferential turbine shrouds 229, 231 or circumferential nozzle 233, second component 512 may be fabricated from a metal material or a ceramic or CMC material.

Sealing system 500 also includes a seal cap 560. Seal cap 560 is positioned between first component 510 and second component 512. More particularly, seal cap 560 is positioned in gap 538 between sealing face 524 and second component first surface 534. Seal cap 560 is in a first, retracted position when sealing system 500 is in first configuration 502 and is in a second, sealing position when sealing system 500 is in second configuration 504. When seal cap is in the second, sealing position, seal cap 560 substantially seals gap 538.

Seal cap 560 includes an end wall 562 and seal legs 564 extending from end wall 562. End wall 562 is positionable between sealing face 524 and seal ridge 536. Seal legs 564 extend from end wall 562 towards second component first surface 534. In the example embodiment, seal legs 564 have a length that is greater than gap 538 between seal ridge 536 and sealing face 524, such that seal cap 560 remains at least partially positioned over seal ridge 536 in any position. In the illustrated embodiment, seal cap 560 matingly engages seal ridge 536. More particularly, seal legs 564 engage top and bottom faces 546, 548 of seal ridge 536. When seal cap 560 is in the first, retracted position (see FIG. 4A), end wall 562 may also engage end face 544 of seal ridge 536. In the example embodiment, as shown in FIG. 6, the profile of seal cap 560 corresponds generally to the profile of seal ridge 536. In other words, seal cap 560 has a substantially arcuate profile or shape.

In an alternative embodiment, seal ridge 536 does not extend entirely about circumference 540 of second component 512. For instance, seal ridge 536 may extend only about a portion of circumference 540. In such embodiments, the profile or shape of seal cap 560 still generally corresponds to the profile or shape of seal ridge 536. For instance, a first and second end of seal cap 560 corresponds generally to a first and second end of seal ridge 536.

In the illustrated embodiment, seal cap 560 is fabricated from any material suitable to withstand the temperatures experienced in the environment of first and second components 510, 512. For instance, where first and second components 510, 512 are one of circumferential turbine shrouds 229, 231 or circumferential nozzle 233, seal cap 560 is fabricated from a metal material or a ceramic or CMC material.

Seal cap 560 is movable between the first, retracted position and the second, sealing position. In the illustrated embodiment, seal cap 560 moves in a piston-like manner to transition between the first, retracted position and the second, sealing position. Specifically, seal-activating fluid 556 is channeled through fluid conduit 554, and a force imparted by the flow of seal-activating fluid 556 moves seal cap 560 from the first, retracted position and to the second, sealing position. End wall 562 contacts sealing face 524 to substantially seal gap 538. In the illustrated embodiment, the seal provided by seal cap 560 has lower stresses than conventional compliance seals.

In the illustrated embodiment of FIGS. 4A-5, seal cap 560 does sustain limited bypass air 570 to pass between end wall 562 and sealing face 524. Moreover, this limited amount of bypass air 570 facilitates cooling of seal cap 560, which may experience high temperatures when in contact with sealing face 524. In addition, seal cap 560 experiences no contact with sealing face 524. Specifically, a recess 572 defined in end wall 562 effectively creates a cushion of air between end wall 562 and sealing face 524 that facilitates reducing or eliminating contact between end wall 562 and sealing face 524, and thus, reduces wear between sealing face 524 and end wall 562. One or more openings 574 (see FIG. 5) in end wall 562, within recess 572, enable transfer of at least a portion of seal-activating fluid 566 through end wall 562 to generate the cushion of air within recess 572.

The above-described sealing systems provide an efficient method for sealing a gap between machinery components. Specifically, the above-described sealing system includes two components separated by a gap. The sealing system also includes a seal cap that moves between a retracted position, in which the gap between the components is open, and an extended or sealing position, in which the gap is at least partially sealed. The embodiments disclosed herein facilitate creating a low-stress (or no-stress) seal between the components, which facilitates improving the operable lifetime of the seal in high-temperature environments.

Exemplary embodiments of sealing systems are described above in detail. The sealing systems, and methods of operating such systems and component devices are not limited to the specific embodiments described herein, but rather, components of the systems and/or steps of the methods may be utilized independently and separately from other components and/or steps described herein. For example, the sealing system may also be used in combination with other systems requiring seal between two components, and are not limited to practice with only the systems and methods as described herein. Rather, the exemplary embodiment can be implemented and utilized between any two circumferentially-spaced components, between any two axially-spaced components, and/or between a rotating component and a stationary component.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A sealing system for sealing a gap between two adjacent components, said system comprising:
   a first component comprising a sealing face;
   a second component comprising:
      a seal ridge extending from a surface of said second component towards said sealing face; and
      a fluid conduit extending through said second component and said seal ridge, said fluid conduit configured to channel a seal activating fluid from a fluid source; and
   a seal cap configured to matingly engage said seal ridge, said seal cap comprising:
      an end wall positionable between said sealing face and said seal ridge; and
      a pair of seal legs extending from said end wall towards said surface of said second component.

2. The sealing system of claim 1, wherein said seal cap is movable between a first, retracted position and a second, sealing position.

3. The sealing system of claim 2, wherein in said first, retracted position a gap is formed between said sealing face and said end wall.

4. The sealing system of claim 2, wherein in said second, sealing position said sealing face and said end wall are in contact.

5. The sealing system of claim 2, wherein a force imparted by a flow of said seal activating fluid is configured to move said seal cap from the first, retracted position and to the second, sealing position.

6. The sealing system of claim 1, wherein said seal cap and said seal ridge each extend linearly from a respective first end to a respective second end.

7. The sealing system of claim 1, wherein said seal cap and said seal ridge each extend arcuately from a respective first end to a respective second end.

8. The sealing system of claim 1, wherein said seal ridge extends axially and comprises a first end and an opposing second end, and said seal cap extends between a first end corresponding to said seal ridge first end and a second end corresponding to said seal ridge second end.

9. The sealing system of claim 1, wherein said seal ridge extends axially about a circumference of said second component and said seal cap further comprises an arcuate shape complementary to a shape of said seal ridge.

10. The sealing system of claim 1, wherein one of said first component and said second component is fabricated from a metal material, and wherein the other of said first component and said second component is fabricated from a ceramic matrix composite material.

11. The sealing system of claim 1, wherein said end wall of said seal cap comprises a recess therein and at least one opening therethrough, said at least one opening configured to permit at least a portion of said seal activating fluid to flow therethrough, to generate a cushion of air within said recess, to reduce contact between said end wall and said sealing face.

12. The sealing system of claim 1, wherein said seal cap is fabricated from at least one of a metal material and a composite material.

13. A method of operating a sealing system for sealing a gap between two adjacent components, said method comprising:
   positioning a seal cap between a first component including a sealing face and a second component including a seal ridge extending from a surface of the second component towards the sealing face, and a fluid conduit extending through the second component and the seal ridge; and
   channeling a seal activating fluid from a fluid source through the fluid conduit, said channeling imparting a force on the seal cap to move the seal cap from a first, retracted position, in which the seal cap matingly engages the seal ridge of the first component, to a second, sealing position, in which the seal cap contacts the sealing face of the first component.

14. The method of claim 13, wherein a gap is formed between the sealing face and the seal cap in the first, retracted position, said channeling at least partially sealing the gap.

15. The method of claim 13, wherein the first component and the second component are circumferentially spaced from one another, wherein said positioning comprises positioning the seal cap in a substantially axially extending orientation between the first component and the second component.

16. The method of claim 13, wherein the first component and the second component are axially spaced from one another, wherein said positioning comprises positioning the seal cap in a substantially circumferentially extending orientation between the first component and the second component.

17. A gas turbine engine comprising:
   a core turbine engine comprising a compressor, a combustor, and a turbine; and
   a segmented turbine shroud at least partially surrounding said turbine, said segmented turbine shroud comprising a plurality of shroud segments arranged circumferentially about said turbine, wherein said plurality of shroud segments comprises:
      a first shroud segment comprising a sealing face;
      a second shroud segment comprising:
         a seal ridge extending from a surface of said second shroud segment towards said sealing face; and
         a fluid conduit extending through said second segment and said seal ridge, said fluid conduit configured to channel a seal activating fluid from a fluid source, and
   said segmented turbine shroud further comprising a seal cap configured to matingly engage said seal ridge, said seal cap comprising:
      an end wall positionable between said sealing face and said seal ridge; and
      a pair of seal legs extending from said end wall towards said surface of said second segment.

18. The gas turbine engine of claim 17, wherein said seal cap is movable between a first, retracted position, in which a gap is formed between said sealing face and said end wall, and a second, sealing position, in which said sealing face and said end wall are in contact.

19. The gas turbine engine of claim 18, wherein a force imparted by a flow of said seal activating fluid is configured to move said seal cap from the first, retracted position and to the second, sealing position.

20. The gas turbine engine of claim 17, wherein said seal cap is fabricated from at least one of a metal material and a ceramic matrix composite material.

* * * * *